United States Patent [19]

Waltz

[11] 4,195,324
[45] Mar. 25, 1980

[54] HEATING CIRCUIT FOR AN ELECTRIC MOTOR

[75] Inventor: Richard W. Waltz, Milwaukee, Wis.

[73] Assignee: Allen-Bradley Company, Milwaukee, Wis.

[21] Appl. No.: 928,303

[22] Filed: Jul. 26, 1978

[51] Int. Cl.² ............................................. H02H 7/08
[52] U.S. Cl. ..................................... 361/25; 318/436; 318/471
[58] Field of Search ...................... 361/23, 24, 25, 31, 361/103; 318/436, 471–473, 558; 219/499, 501, 209; 307/252 R, 252 UA; 324/62

[56] References Cited

U.S. PATENT DOCUMENTS

| | | | |
|---|---|---|---|
| 3,582,712 | 6/1971 | Blair | 318/436 |
| 3,717,804 | 2/1973 | Dikinis | 318/436 |
| 3,774,096 | 11/1973 | Hann | 318/436 |
| 3,959,692 | 5/1976 | Wetzel | 361/24 |
| 4,135,122 | 1/1979 | Holmquist et al. | 318/436 |

Primary Examiner—Patrick R. Salce
Attorney, Agent, or Firm—Quarles & Brady

[57] ABSTRACT

An SCR is connected across one of three line contacts which couple the power lines to the windings of an a.c. motor. When the line contacts are opened to shut down the motor, heating current is applied to one of the motor windings through the SCR to raise its temperature above the ambient dew point. The SCR is fired every cycle of the line current and the firing angle is controlled in response to a command signal to provide the proper amount of heating current in the motor winding. The command signal is generated by summing a preselected reference signal with a negative feedback signal which is indicative of the amount of motor heating.

6 Claims, 4 Drawing Figures

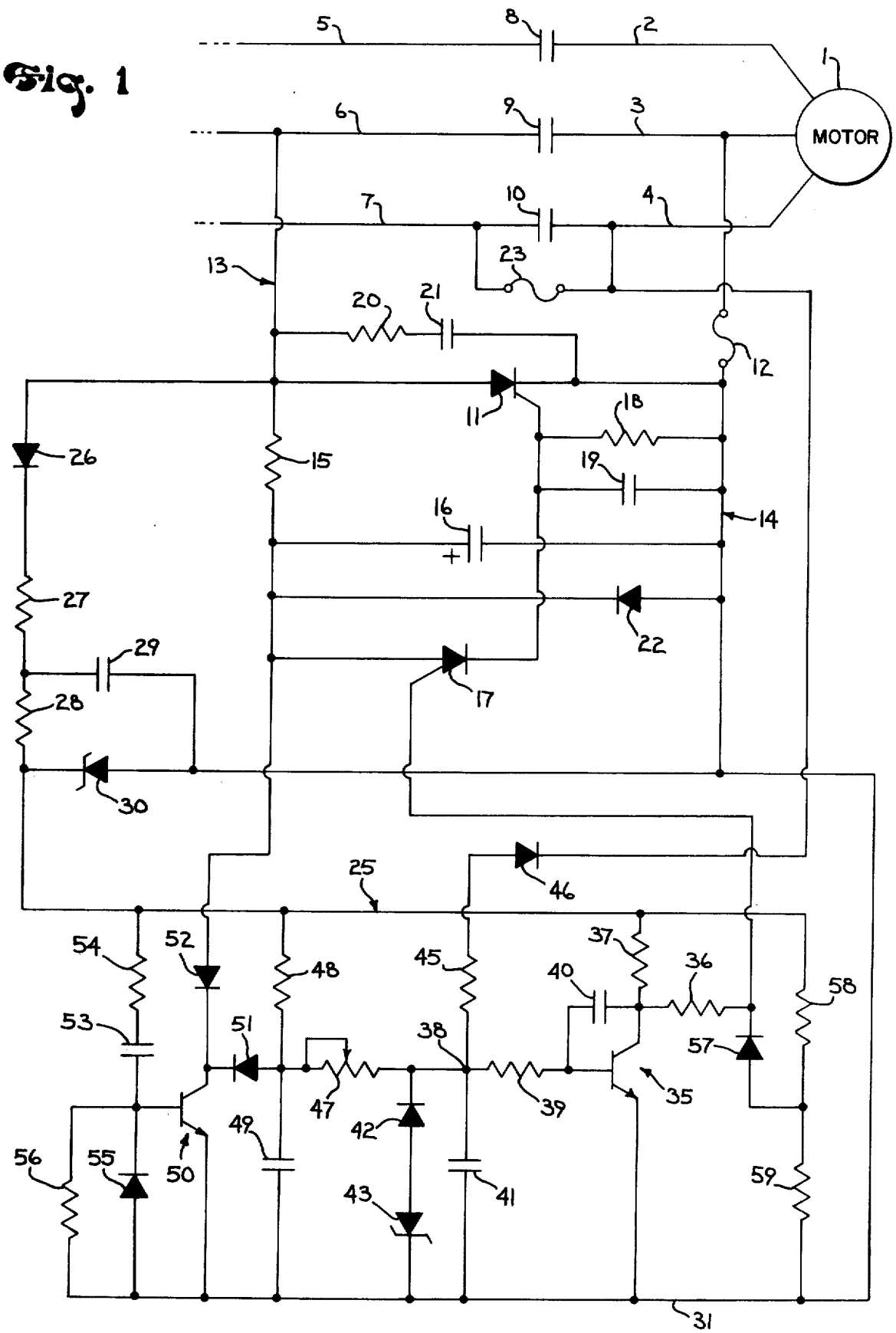

HEATING CIRCUIT FOR AN ELECTRIC MOTOR

BACKGROUND OF THE INVENTION

The field of the invention is motor heating devices of the type which maintain the temperature of the motor a few degrees above ambient temperature when it is nonoperating.

When large electric motors are shut down and cooled to a temperature below the ambient dew point, moisture condenses on their windings, brushes and other compartments. This condensation can destroy the motor if not controlled and it is common practice, therefore to provide heating circuits which maintain the temperature of the motor above the dew point when the motor is shut down.

The most prevalent heating circuits are those which turn on a separate heating element or apply a low voltage heating current to a motor winding when the motor is shut down. Such circuits are disclosed in U.S. Pat. Nos. 2,338,518; 3,445,743; 2,240,207 and 3,582,712.

More recently, solid state electronic switches, such as SCRs and triacs, have been employed to apply line current to one or more motor windings when the motor is shut down. As disclosed in U.S. Pat. Nos. 3,717,804 and 3,774,096, timing circuits are employed to control the firing angle of the electronic switch and to thereby control the amount of heating current supplied to the motor winding when the motor is not running.

Yet another approach is disclosed in pending U.S. patent application Ser. No. 800,204 entitled "Method and Apparatus for Heating Electrical Motors and Like Devices." This circuit also employs an SCR to control the amount of heating current applied to a motor winding when the motor is not running, but rather than controlling the firing angle of the SCR with a timing circuit, the SCR is periodically fired for a complete half cycle. A digital counter is used to count line cycles and to thereby determine the period between SCR firings.

All of the prior art motor heating devices and circuits are "open loop" systems which assume that a desired temperature rise will occur when a preselected portion of the line current is applied to the motor winding. In practice, however, the line voltage which determines the amount of heating current varies considerably in amplitude and the value of circuit components change with temperature and age with the result that the desired motor temperature may not be achieved.

SUMMARY OF THE INVENTION

The present invention relates to a heating circuit which becomes operable to maintain a motor at a preselected temperature when the line contactor which couples the motor to the a.c. power lines is opened. More specifically, the invented circuit includes an electronic switch, such as an SCR or triac, which is connected across one of the line contacts and which is fired every cycle of the line current by a firing circuit. The firing circuit is responsive to a command signal applied to its input to control the timing of each firing and the command signal is generated by a circuit which sums a preselected reference signal with a feedback signal indicative of motor heating. When the heating current rises above a preselected amount the firing is delayed and less heating current is applied to the motor winding. On the other hand, when motor temperature drops, the firing is advanced and more heating current is conducted through the electronic switch to the motor winding.

A general object of the invention is to provide a motor heating circuit which maintains the motor at a relatively constant temperature above the ambient temperature despite variations in line voltage and the values of circuit components. By feeding back a signal indicative of actual motor heating a closed loop system is formed which automatically compensates for variations in line voltage and the values of circuit components.

Another object of the invention is to momentarily inhibit the firing of the electronic switch when the line contacts are first opened. The negative feedback signal is obtained by sensing the voltage across a motor winding. Not only is this voltage proportionate to the motor heating current after the motor is completely shut down, but it also serves to prevent the electronic switch from being fired when potentially destructive voltages are present across the motor windings.

The foregoing and other objects and advantages of the invention will appear from the following description. In the description reference is made to the accompanying drawings which form a part hereof and in which there is shown by way of illustration an embodiment of the invention. Such embodiment does not necessarily represent the full scope of the invention, but rather the invention may be employed in many different embodiments, and reference is made to the claims herein for interpreting the breadth of the invention.

BRIEF DESCRIPTION OF THE DRAWINGS

FIG. 1 is an electrical schematic diagram of the motor heating circuit of the present invention.

DESCRIPTION OF THE PREFERRED EMBODIMENT

Figure 2A:
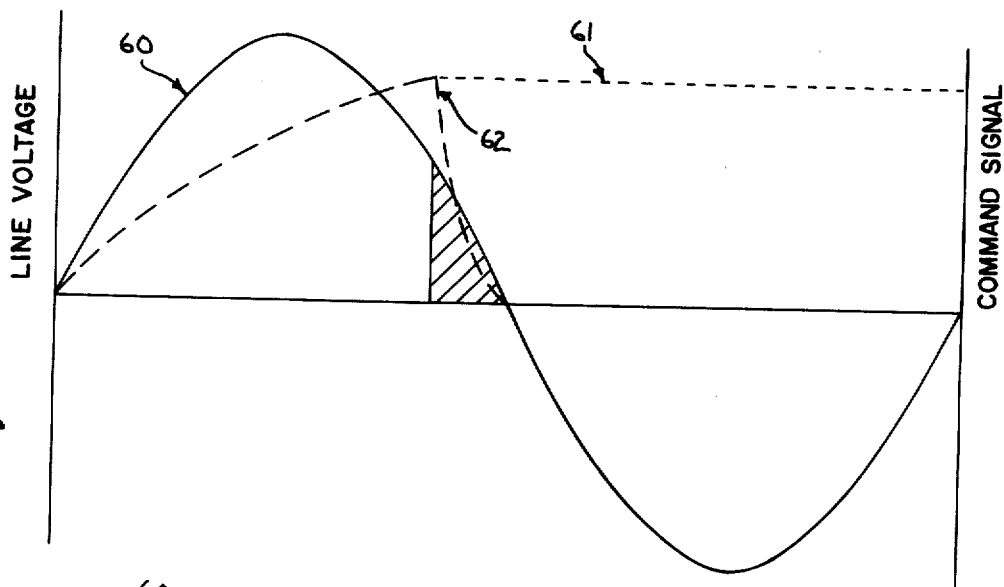
FIGS. 2A–2C are graphic illustrations of signals which appear at various points in the circuit of FIG. 1.

Referring particularly to FIG. 1, a three-phase a.c. motor 1 is connected through three lines 2, 3 and 4 to a set of a.c. power lines 5, 6 and 7. A set of three line contacts 8, 9 and 10 which form part of a motor starter circuit (not shown in the drawings) couple the power lines 5, 6 and 7 to the motor 1. A line contactor such as that disclosed in U.S. Pat. No. 4,006,440 is used to operate the line contacts 8, 9 and 10 and the line contactor may be employed in a motor starter circuit such as that disclosed in U.S. Pat. No. 3,444,437. The heating circuit of the present invention is mounted in the same enclosure which houses the line contactor and the components of the motor starter circuit.

The motor heating circuit includes a silicon controlled rectifier (SCR) 11 which is connected in series with a fuse 12 across the line contact 9. The connection of the anode on the SCR 11 to the power line 6 forms an a.c. bus 13 and the connection of its cathode to the fuse 12 forms an a.c. bus 14. A fuse 23 is connected across the line contact 10 and together with the fuse 12 and SCR 11 it forms a conductive path through one of the motor windings when the line contacts 8–10 are open. By controlling the firing of the SCR 11, the amount of heating current which flows through this conductive path is controlled and the temperature of the motor 1 is maintained a few degrees above the ambient dew point.

A charging circuit comprised of a resistor 15 and a capacitor 16 connects between the a.c. buses 13 and 14, and the capacitor 16 is charged during each positive cycle of the power line 6. A programmable unijunction transistor 17 connects between the juncture of the resistor 15 and capacitor 16 and its cathode connects to the gate of the SCR 11. The resistor 15, capacitor 16 and programmable unijunction transistor 17 form a firing circuit which drives the SCR 11 into its conductive state during a portion of each cycle of the line current. A resistor 18 and capacitor 19 connect between the gate of the SCR 11 and the a.c. bus 14 to filter out noise signals, and a resistor 20 and a capacitor 21 connect between the cathode of the SCR 11 and the a.c. bus 13 to suppress transient voltages. A diode 22 is connected in parallel with the charging capacitor 16 to prevent it from charging with a reverse polarity during the negative portion of the applied a.c. line current.

A d.c. power supply connects to the a.c. buses 13 and 14 to provide 27 volts to a positive d.c. bus 25. The power supply includes a rectifier diode 26 which connects to the a.c. bus 13 and a filter comprised of resistors 27 and 28 and a capacitor 29. A zener diode 30 connects across the output of the rectifier circuit and serves to regulate the d.c. output voltage. The a.c. bus 14 connects to a negative d.c. bus 31 which serves as signal ground for the circuitry to be described hereinafter.

The programmable unijunction transistor 17 is driven into conduction when the voltage at its anode exceeds the voltage applied to its gate. Since the anode voltage rises and falls during each cycle of line current as the capacitor 16 charges and discharges, the firing of the programmable unijunction transistor 17 is controlled by the level of its gate voltage. When the unijunction transistor 17 fires, the capacitor 16 discharges through it into the gate of the SCR 11 to drive it into its conductive state for the remainder of the positive cycle of the line current. The firing of the SCR 11 is thus controlled by the voltage applied to the gate of unijunction transistor 17. This voltage is referred to herein as the command signal.

The command signal is generated by a summing circuit. The summing circuit includes an NPN transistor 35 which has its emitter connected to the negative d.c. bus 31 and its collector connected through a coupling resistor 36 to the gate of the programmable unijunction transistor 17. A load resistor 37 connects the collector to the positive d.c. bus 25 and the base of the transistor 35 is connected to a summing point 38 through a resistor 39. A frequency compensation capacitor 40 connects between the transistor base and its collector and a filter capacitor 41 connects between the summing point 38 and the negative d.c. bus 31. A branch comprised of a diode 42 and zener diode 43 is connected also to the summing point 38 to prevent the base of the transistor 35 from being driven to an excessively negative voltage.

The transistor 35 amplifies the net current flowing into the summing point 38 to provide the command signal which drives the programmable unijunction transistor 17. As the net positive current into the summing point increases, the voltage at the collector of transistor 35 decreases. The resulting decrease in the command signal causes the programmable unijunction transistor 16, and hence, the SCR 11, to fire earlier during each positive half cycle of the line voltage. More current is thus applied to the motor winding and its temperature rises.

A negative feedback signal is applied to the summing point 38 through a resistor 45 and a diode 46. The cathode of the diode 46 connects to the line 4 emanating from the motor 1 and a negative voltage equal to the IxR drop in the motor winding is thus applied to generate a negative current to the summing point 38. This negative feedback signal is indicative of the amount of motor heating, or in other words, the temperature difference between the motor and its surroundings.

A positive reference signal is also applied to the summing point 38 by a circuit comprised of potentiometer 47, resistor 48 and charging capacitor 49. The resistor 48 connects to the positive d.c. bus 25 and it supplies current to the summing point 38 through the potentiometer 47. The slider on the potentiometer 47 may be manually set to adjust the magnitude of the reference signal and to thereby preselect the temperature difference to which the motor 1 is to be heated. The charging capacitor 49 is relatively large in value and it operates when the circuit is first turned on to charge up slowly and thereby gradually apply the reference signal to the summing point 38. As will be explained hereinafter, this enables the SCR 11 to be gradually phased on.

A circuit which includes an NPN transistor 50 operates in combination with the charging capacitor 49 to insure that the system behaves properly during start up conditions. The emitter of this transistor 50 is connected to the negative d.c. supply bus 31 and its collector is connected through a diode 51 to the charging capacitor 49. The collector also connects through a diode 52 to the charging capacitor 16. The base of the transistor 50 connects through a capacitor 53 and resistor 54 to the positive d.c. supply bus 25. It also connects through a diode 55 and a resistor 56 to the negative d.c. supply bus 31. The size of the capacitor 53 is chosen such that when voltage is first applied to charge the power supply capacitor 29, a substantial current flows through the resistor 54 and capacitor 53 to the base of the transistor 50. As a result, the transistor 50 is turned on and its collector is driven low to inhibit the charging capacitors 16 and 49 from being charged while the power supply is coming up to voltage. After the power supply has reached its operating voltage, the capacitor 53 is fully charged and it blocks base current to the transistor 50 causing it to turn off. The capacitors 16 and 49 may then begin to charge and normal circuit operation commences.

To insure that the SCR 11 is not phased on excessively, a circuit comprised of diode 57 and resistors 58 and 59 is connected to the gate of the programmable unijunction 17. Although the transistor 35 controls the gate voltage on the programmable unijunction transistor 17, it cannot drive the gate voltage below a value which is established by the voltage at the junction of the resistors 58 and 59. This prevents the programmable unijunction transistor 17 from being fired before the charging capacitor 16 has a sufficient charge to successfully fire the SCR 11.

The operation of the motor heating circuit can best be explained with reference to FIGS. 2A-2C. The voltage across the a.c. buses 13 and 14 is indicated by the solid sinusoidal line 60. This voltage is equal in magnitude and frequency to the line voltage across the power lines 6 and 7. The command signal applied to the programmable unijunction transistor 17 is represented by a dotted line 61. The level of the command signal is different in FIGS. 2A-2C, with FIG. 2B being a low level and FIG. 2C being a high level command signal. The dashed sawtooth waveform 62 in each drawing represents the voltage across the charging capacitor 16. In each case, the capacitor 16 is charged up to the level of the command signal at which point the programmable unijunction transistor 17 conducts to discharge the capacitor 16 into the gate of the SCR 11. The SCR 11 is thus fired and it conducts heating current to the motor winding during the portion of the line voltage cycle indicated by the crosshatching.

Figure 2B:
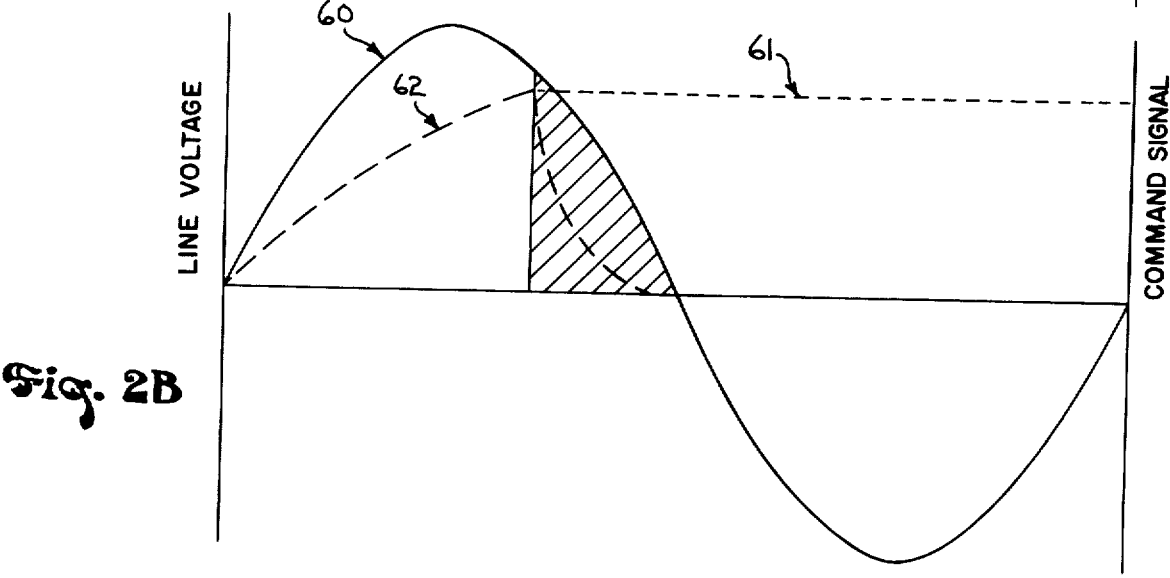
Figure 2C:
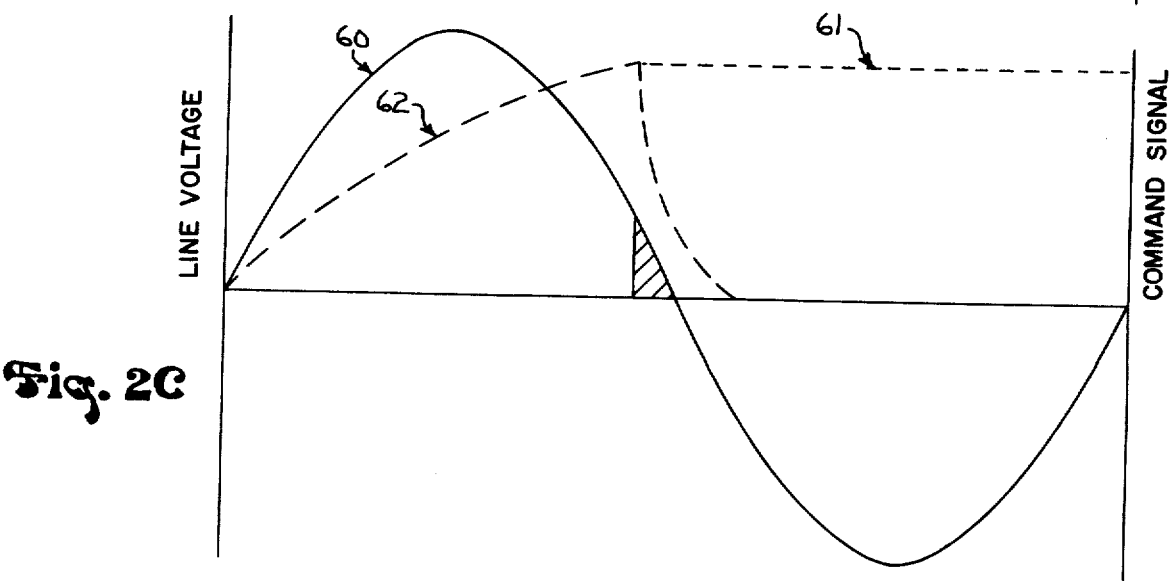

Although the graphic illustrations in FIGS. 2A–2C show the command signal 61 being varied and the line voltage 60 remaining constant, it can be appreciated that variations in line voltage may in fact be the cause of a change in command signal level. For example when line voltage drops, less heating current is applied to the motor winding for any given SCR firing angle. As a result, the negative feedback signal applied to the summing point 38 drops and the command signal is reduced to fire the unijunction transistor 17 and SCR 11 earlier during each positive portion of the line voltage. More heating current is thus conducted to the motor winding and the temperature difference of the motor 1 remains relatively constant despite the variation in line voltage.

The closed loop operation of the motor heating circuit also automatically adjusts to changes in circuit components due to such factors as age or temperature. For example, if the value of charging capacitor 16 or charging resistor 15 should change, the time constant of the sawtooth waveform 62 would also change. In an open loop system such a change would affect the SCR firing angle and would thus change the temperature of the motor 1. In the present system, however, the command signal automatically adjusts to offset this change so that motor temperature difference remains substantially unchanged.

Also, when the motor is first shut down by opening the line contacts 8–10, a substantial, but momentary, voltage exists across the motor windings as magnetic fields collapse. This voltage could be destructive if the SCR 11 were fired at this time. The present circuit automatically prevents this from occurring. More specifically, the negative feedback signal is very large when this voltage is present, and as explained above, this presents the unijunction transistor 17 and SCR 11 from being fired. When the voltage across the motor windings decays to well below destructive levels, normal motor heating circuit commences.

I claim:

1. A motor heating circuit for use in combination with a motor starter having a set of line contacts which couple a.c. line current to the winding of an a.c. motor, comprising:

electronic switch means having current conducting elements which are connected across one of said line contacts and a current control element which is responsive to an applied gating signal to enable current conduction through said current conducting elements to said motor winding;

gating signal generator means having an output connected to said current control element and being operable to generate said gating signal once during each cycle of line current, the timing of said generated gating signal being a function of the magnitude of a command signal applied to its input terminal;

a feedback circuit coupled to the a.c. motor to generate a feedback signal indicative of motor temperature;

a reference circuit for generating a preselected signal; and a summing circuit connected to said feedback signal circuit and said reference signal circuit for generating a command signal to the input of said gating signal generator which is proportional in magnitude to the sum of said feedback signal and said reference signal.

2. The motor heating circuit as recited in claim 1 in which said gating signal generator means includes:

a charging capacitor which is charged during each cycle of the line current; and transistor means which connects to the charging capacitor and which connects to receive said command signal, said transistor means being operable to generate said gating signal when said charging capacitor charges to a magnitude determined by the magnitude of said command signal.

3. The motor heating circuit as recited in claim 2 in which said electronic switch means is an SCR and said transistor means is a programmable unijunction transistor.

4. The motor heating circuit as recited in claims 1, 2 or 3 in which said feedback circuit is connected to sense the voltage drop across said motor winding and generate a negative voltage as said feedback signal.

5. The motor heating circuit as recited in claim 1 or 2 in which said summing circuit includes a transistor having its base element connected to receive both said preselected reference signal and said feedback signal, and having its collector element coupled to said gating signal generating means.

6. The motor heating circuit as recited in claim 2 which includes means for momentarily inhibiting the charging of said charging capacitor when said line contacts are opened.

* * * * *